(12) United States Patent
Ichikawa

(10) Patent No.: US 10,967,748 B2
(45) Date of Patent: Apr. 6, 2021

(54) ELECTRIC VEHICLE

(71) Applicant: TOYOTA JIDOSHA KABUSHIKI KAISHA, Toyota (JP)

(72) Inventor: Shinji Ichikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 47 days.

(21) Appl. No.: 15/856,990

(22) Filed: Dec. 28, 2017

(65) Prior Publication Data

US 2018/0198173 A1 Jul. 12, 2018

(30) Foreign Application Priority Data

Jan. 12, 2017 (JP) .............................. JP2017-003414

(51) Int. Cl.
| | |
|---|---|
| *H01M 10/42* | (2006.01) |
| *H01M 10/613* | (2014.01) |
| *H01M 10/48* | (2006.01) |
| *H01M 10/625* | (2014.01) |
| *B60L 53/14* | (2019.01) |
| *H01M 10/633* | (2014.01) |
| *H01M 10/617* | (2014.01) |

(Continued)

(52) U.S. Cl.
CPC .............. *B60L 53/14* (2019.02); *B60L 58/12* (2019.02); *B60L 58/26* (2019.02); *B60L 58/27* (2019.02); *H01M 10/425* (2013.01); *H01M 10/486* (2013.01); *H01M 10/613* (2015.04); *H01M 10/617* (2015.04); *H01M 10/625* (2015.04); *H01M 10/633* (2015.04); *B60K 2001/005* (2013.01); *B60L 2220/42* (2013.01); *B60L 2240/662* (2013.01); *H01M 2220/20* (2013.01); *H04L 67/12* (2013.01); *Y02T 10/70* (2013.01); *Y02T 90/16* (2013.01)

(58) Field of Classification Search
None
See application file for complete search history.

(56) References Cited

U.S. PATENT DOCUMENTS

| | | | |
|---|---|---|---|
| 9,229,623 B1 * | 1/2016 | Penilla .................. | G06F 3/0362 |
| 2006/0033468 A1 * | 2/2006 | Zhu ........................ | B60L 58/12 |
| | | | 320/104 |

(Continued)

FOREIGN PATENT DOCUMENTS

| | | |
|---|---|---|
| CN | 102815222 A | 12/2012 |
| JP | 2006-50892 A | 2/2006 |

(Continued)

*Primary Examiner* — Scott J. Chmielecki
(74) *Attorney, Agent, or Firm* — Sughrue Mion, PLLC

(57) ABSTRACT

An electric vehicle includes a battery that stores electric power for traveling, a sensor that detects the temperature of the battery, a communication circuitry configured to communicate with a server configured to collect information as to a plurality of vehicles, a temperature adjusting circuitry configured to adjust the temperature of the battery, and a control circuitry configured to control the temperature adjusting circuitry. The information as to the vehicles includes at least an ambient temperature in a surrounding area of each vehicle. The control circuitry selectively switches the mode of operation of the temperature adjusting circuitry by using the temperature of the battery and the ambient temperature collected in the server.

9 Claims, 5 Drawing Sheets

(51) Int. Cl.
*B60L 58/26* (2019.01)
*B60L 58/27* (2019.01)
*B60L 58/12* (2019.01)
*H04L 29/08* (2006.01)
*B60K 1/00* (2006.01)

(56) References Cited

U.S. PATENT DOCUMENTS

| | | | |
|---|---|---|---|
| 2010/0212338 A1 | 8/2010 | Hermann et al. | |
| 2011/0308765 A1* | 12/2011 | Kumar | H01M 10/6565 165/47 |
| 2012/0217933 A1* | 8/2012 | Abe | H01M 10/443 320/128 |
| 2012/0225341 A1* | 9/2012 | Major | B60H 1/00278 429/120 |
| 2012/0316712 A1* | 12/2012 | Simonini | B60L 58/24 701/22 |
| 2013/0335032 A1* | 12/2013 | Kuribayashi | H02J 7/0027 320/137 |
| 2013/0346308 A1* | 12/2013 | Naito | B60L 53/64 705/41 |
| 2015/0024286 A1* | 1/2015 | Duncan | H01M 4/42 429/403 |
| 2015/0219522 A1* | 8/2015 | Tseng | F02D 41/22 701/102 |
| 2016/0031289 A1* | 2/2016 | Murata | H01M 10/663 701/22 |
| 2016/0339797 A1* | 11/2016 | Dai | B32B 7/04 |
| 2016/0365612 A1* | 12/2016 | Bradwell | H01M 10/627 |
| 2017/0138758 A1* | 5/2017 | Ricci | H01G 11/12 |
| 2017/0144562 A1* | 5/2017 | Thomas | H04W 4/80 |
| 2017/0190261 A1* | 7/2017 | Cheng | B60L 50/60 |
| 2017/0200994 A1* | 7/2017 | Kim | H02J 7/1423 |
| 2017/0288286 A1* | 10/2017 | Buckhout | H01M 2/1077 |
| 2017/0324122 A1* | 11/2017 | Poirier | H01M 10/0566 |
| 2017/0331159 A1* | 11/2017 | Keser | H01M 10/482 |
| 2018/0037134 A1* | 2/2018 | Weicker | H01M 16/00 |
| 2018/0170207 A1* | 6/2018 | Ko | H01M 10/613 |
| 2018/0236890 A1* | 8/2018 | Cyrne | B60L 58/12 |
| 2018/0241100 A1* | 8/2018 | Kudo | H01M 10/482 |
| 2018/0251102 A1* | 9/2018 | Han | H01M 2/345 |
| 2018/0316207 A1* | 11/2018 | Irish | H02J 7/007192 |

FOREIGN PATENT DOCUMENTS

| | | |
|---|---|---|
| JP | 2010-200604 A | 9/2010 |
| JP | 2013-34323 A | 2/2013 |
| JP | 2014-066542 A | 4/2014 |

* cited by examiner

FIG. 4

| | NORMAL TEMPERATURE INCREASING MODE | VERY LOW TEMPERATURE MODE | | |
| --- | --- | --- | --- | --- |
| | | FIRST VERY LOW TEMPERATURE MODE | SECOND VERY LOW TEMPERATURE MODE | |
| START TEMPERATURE Tst | Tst0 | Tst1 | Tst2 | Tst0 > Tst1 > Tst2 |
| TARGET TEMPERATURE Ttag | Ttag0 | Ttag1 | Ttag2 | Ttag0 > Ttag1 > Ttagt2 |
| OPERATING DURATION | H0 | H1 | H2 | H0 < H1 < H2 |

ELECTRIC VEHICLE

INCORPORATION BY REFERENCE

The disclosure of Japanese Patent Application No. 2017-003414 filed on Jan. 12, 2017 including the specification, drawings and abstract is incorporated herein by reference in its entirety.

BACKGROUND

1. Technical Field

The present disclosure relates to an electric vehicle and particularly, relates to a technology that adjusts the temperature of a battery mounted in the electric vehicle.

2. Description of Related Art

An electric vehicle that includes a battery storing electric power for traveling is disclosed in Japanese Unexamined Patent Application Publication No. 2014-66542 (JP 2014-66542 A). The electric vehicle estimates a change in the temperature of the battery of the host vehicle by using temperature information acquired from a plurality of other vehicles in the same environment (position) as the host vehicle.

SUMMARY

Generally, a battery has a characteristic such that the battery has a decrease in the input and output capabilities (receivable electric power and outputable electric power) thereof or is likely to deteriorate according to the temperature of the battery. Thus, in order to suppress a decrease in the input and output capabilities or deterioration of the battery, it is desirable to accurately estimate a change in the temperature of the battery and adjust (decrease or increase) the temperature of the battery when the temperature of the battery is predicted to deviate from an appropriate range.

In the electric vehicle disclosed in JP 2014-66542 A, a change in the temperature of the battery of the host vehicle is estimated by using the temperature information of another vehicle in the same environment as the host vehicle. However, the temperature of the battery may be changed according to not only the environment but also a mount structure (thermal insulation structure), a control history (heat generation history), and the like of the battery. Thus, even when the host vehicle and the other vehicle are in the same environment, there may be a difference between the temperature of the battery of the host vehicle and the temperature of the battery of the other vehicle. In such a case, the temperature of the battery of the host vehicle is not appropriately estimated with a temperature estimation technique disclosed in JP 2014-66542 A. Consequently, the temperature of the battery may not be adjusted appropriately.

The present disclosure provides appropriate adjustment of the temperature of a battery in an electric vehicle that is configured to communicate with a server outside the vehicle.

An aspect of the present disclosure relates to an electric vehicle including a battery that stores electric power for traveling, a sensor that detects a temperature of the battery, a communication circuitry configured to communicate with a server configured to collect information as to a plurality of vehicles, a temperature adjusting circuitry configured to adjust the temperature of the battery, and a control circuitry configured to control the temperature adjusting circuitry. The information as to the vehicles includes at least an ambient temperature in a surrounding area of each vehicle. The control circuitry selectively switches a mode of operation of the temperature adjusting circuitry by using the temperature of the battery and the ambient temperature collected in the server.

The configuration selectively switches the mode of operation of the temperature adjusting circuitry by using both the temperature of the battery detected within the electric vehicle (hereinafter, referred to as a "host vehicle") and the ambient temperature collected in the server. Thus, the temperature of the battery can be adjusted by appropriately selecting the mode of operation of the temperature adjusting circuitry, considering both the temperature of the battery detected within the host vehicle and the ambient temperature collected in the server. Consequently, the temperature of a battery can be appropriately adjusted in an electric vehicle configured to communicate with a server outside the vehicle.

In the electric vehicle according to the aspect of the present disclosure, the control circuitry may use any of the temperature of the battery and the ambient temperature to determine whether or not to adjust the temperature of the battery, and may operate the temperature adjusting circuitry in a first mode when the control circuitry determines to adjust the temperature of the battery by using the temperature of the battery. The control circuitry may operate the temperature adjusting circuitry in a second mode having a different mode of operation of the temperature adjusting circuitry from the first mode, when the control circuitry determines to adjust the temperature of the battery by using the ambient temperature.

As described above, the temperature of the battery may be changed according to not only the ambient temperature but also a mount structure (thermal insulation structure), a control history (heat generation history), and the like of the battery in the host vehicle. Thus, a temperature adjusting capability requested for the temperature adjusting circuitry is regarded as being different when the control circuitry determines, by using the temperature of the battery detected within the host vehicle, that the temperature of the battery needs to be adjusted, and when the control circuitry determines, by using the ambient temperature collected in the server, that the temperature of the battery needs to be adjusted.

In view of such a point, the configuration operates the temperature adjusting circuitry in the first mode when the control circuitry determines, by using the temperature of the battery detected within the host vehicle, that the temperature of the battery needs to be adjusted, and operates the temperature adjusting circuitry in the second mode having a different mode of operation of the temperature adjusting circuitry from the first mode when the control circuitry determines, by using the ambient temperature collected in the server, that the temperature of the battery needs to be adjusted. Accordingly, the mode of operation of the temperature adjusting circuitry can be appropriately switched in accordance with the temperature adjusting capability requested for the temperature adjusting circuitry.

In the electric vehicle according to the aspect of the present disclosure, the temperature adjusting circuitry may include a temperature increasing circuitry configured to increase the temperature of the battery by using electric power of the battery. The control circuitry may operate the temperature increasing circuitry in a first mode having a target temperature of the battery equal to a first temperature when the control circuitry determines, by using the temperature of the battery detected by the sensor, that the temperature of the battery needs to be increased, and operate the temperature increasing circuitry in a second mode having the target temperature of the battery equal to a second temperature lower than the first temperature when the control circuitry determines, by using the ambient temperature collected in the server, that the temperature of the battery needs to be increased.

In the electric vehicle according to the aspect of the present disclosure, the control circuitry may select the first mode when the temperature of the battery detected in a current position of the electric vehicle has a history of being decreased below a first predetermined value, and may select the second mode when the ambient temperature in the surrounding area of the current position of the electric vehicle has a history of being decreased below a second predetermined value.

The configuration sets the target temperature of the battery to the second temperature lower than the first temperature when the control circuitry determines, by using the ambient temperature collected in the server, that the temperature of the battery needs to be increased. Decreasing the target temperature in such a manner reduces electric power needed for increasing the temperature of the battery, and the temperature of the battery can be continuously increased for a long period. Thus, for example, even when the host vehicle is unusually left in a very low temperature area, freezing of the battery can be suppressed for a longer period than usual. Thus, when the user rides on the host vehicle for the next time, a situation in which the battery is frozen and cannot be used can be avoided.

In the electric vehicle according to the aspect of the present disclosure, the temperature adjusting circuitry may include a cooling circuitry configured to cool the battery. When the control circuitry executes external charging that charges the battery with electric power from outside the vehicle, the control circuitry may execute pre-charging cooling control that cools the battery by operating the cooling circuitry before executing the external charging, when the control circuitry determines, by using at least one of the temperature of the battery detected by the sensor and the ambient temperature collected in the server, that the battery needs to be cooled. When the control circuitry executes the external charging, the control circuitry may not execute the pre-charging cooling control when the control circuitry determines, by using both the temperature of the battery detected by the sensor and the ambient temperature collected in the server, that the battery does not need to be cooled.

In the electric vehicle according to the aspect of the present disclosure, the control circuitry may determine that the battery needs to be cooled, when the temperature of the battery detected at a time of executing the external charging is greater than or equal to a first predetermined value, and may determine that the battery needs to be cooled, when the ambient temperature in the surrounding area of the current position of the electric vehicle has a history of being increased to or above a second predetermined value.

The configuration executes the pre-charging cooling control when the control circuitry determines, by using at least one of the temperature of the battery detected within the host vehicle and the ambient temperature collected in the server, that the battery needs to be cooled. Thus, the temperature of the battery can be decreased in advance before the battery is placed into a high temperature state due to heat generated by the external charging. Consequently, the battery is not left in a high temperature state, and deterioration of the battery is reduced.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is a diagram illustrating one example of a start temperature, a target temperature, and a heater operating duration in a normal temperature increasing mode and a very low temperature mode (a first very low temperature mode and a second very low temperature mode)

DETAILED DESCRIPTION OF EMBODIMENTS

Figure 1:
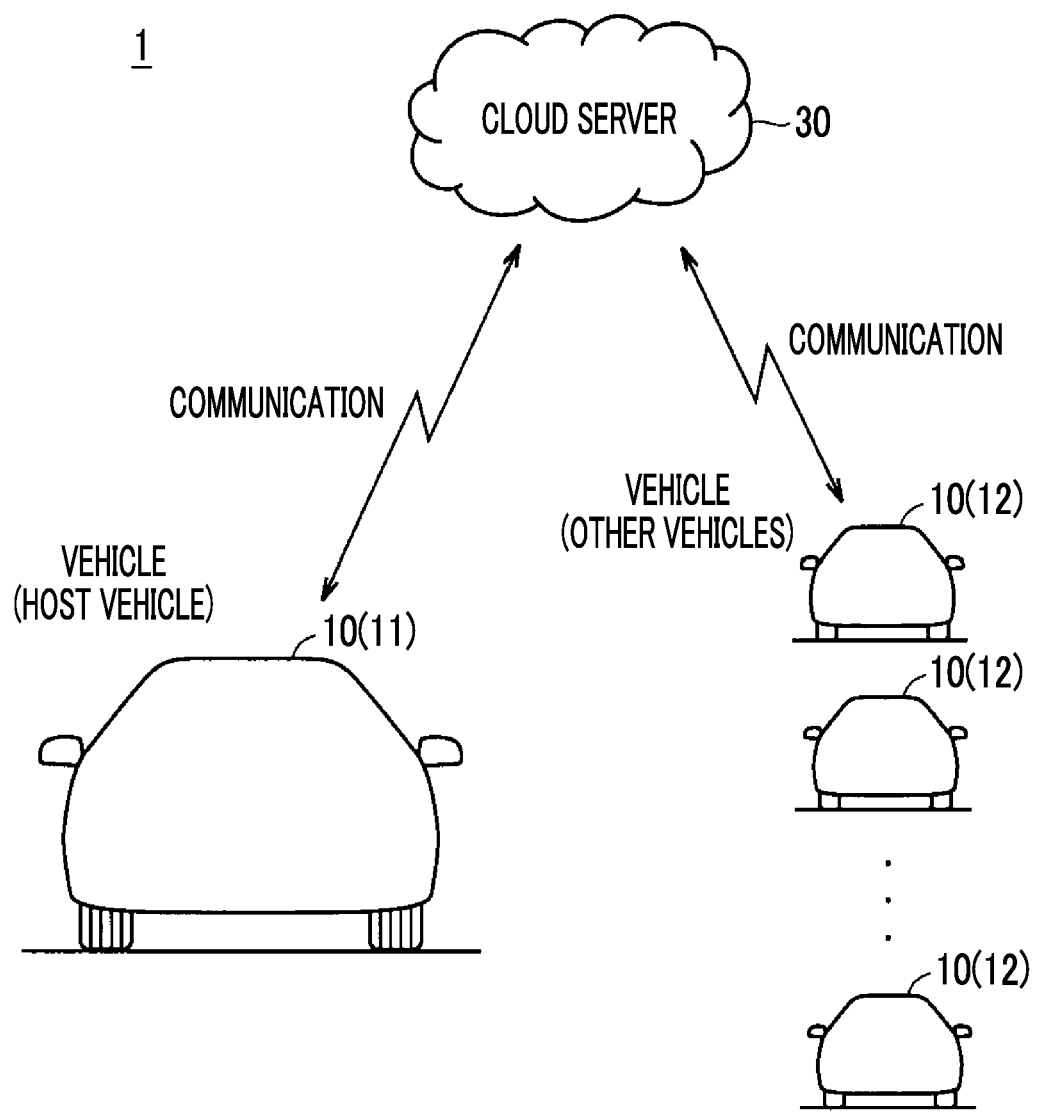
FIG. 1 is a diagram schematically illustrating one example of an overall configuration of a vehicle control system.

Hereinafter, an embodiment of the present disclosure will be described in detail with reference to the drawings. The same or corresponding parts in the drawings will be designated with the same reference signs and will be described once.

FIG. 1 is a diagram schematically illustrating one example of an overall configuration of a vehicle control system 1 according to the present embodiment. The vehicle control system 1 includes a plurality of vehicles 10 and a cloud server 30.

Each vehicle 10 is configured to be wirelessly communicable with the cloud server 30 and is a so-called connected vehicle. Each vehicle 10 transmits information included in the vehicle 10 to the cloud server 30 at predetermined cycles (for example, every few seconds).

The information transmitted to the cloud server 30 by each vehicle 10 includes various types of information related to traveling, environment, control, and the like of the vehicle 10, such as the current position of the vehicle 10, an accelerator pedal operation amount, a brake pedal operation amount, a traveling load (traveling power or the like), and an ambient temperature (atmospheric temperature).

The cloud server 30 accumulates the information received from each vehicle 10 and the time of reception of the information by classification for each vehicle 10. The cloud server 30 is configured to be capable of transmitting data requested by each vehicle 10 to the vehicle 10 in accordance with a request from the vehicle 10.

Hereinafter, the vehicle 10 that executes control according to the present disclosure will be referred to as a "host vehicle 11", and the vehicles 10 other than the host vehicle 11 will be referred to as "other vehicles 12". In the present embodiment, the host vehicle 11 is a hybrid vehicle that includes a motor generator and an engine as a drive power source. The host vehicle 11 is not limited to a hybrid vehicle, provided that the host vehicle 11 is an electric vehicle that includes a battery storing electric power for traveling. For example, the host vehicle 11 may be an electric automobile not including an engine, or a fuel cell automobile.

The vehicle type of the other vehicles 12 is not particularly limited, provided that the vehicle type is a connected vehicle configured to be wirelessly communicable with the cloud server 30. For example, the other vehicles 12 may be hybrid vehicles, or may be electric automobiles including a motor as a drive power source, or fuel cell automobiles, or may be vehicles in the related art (engine vehicles) including an engine as a drive power source.

Figure 2:
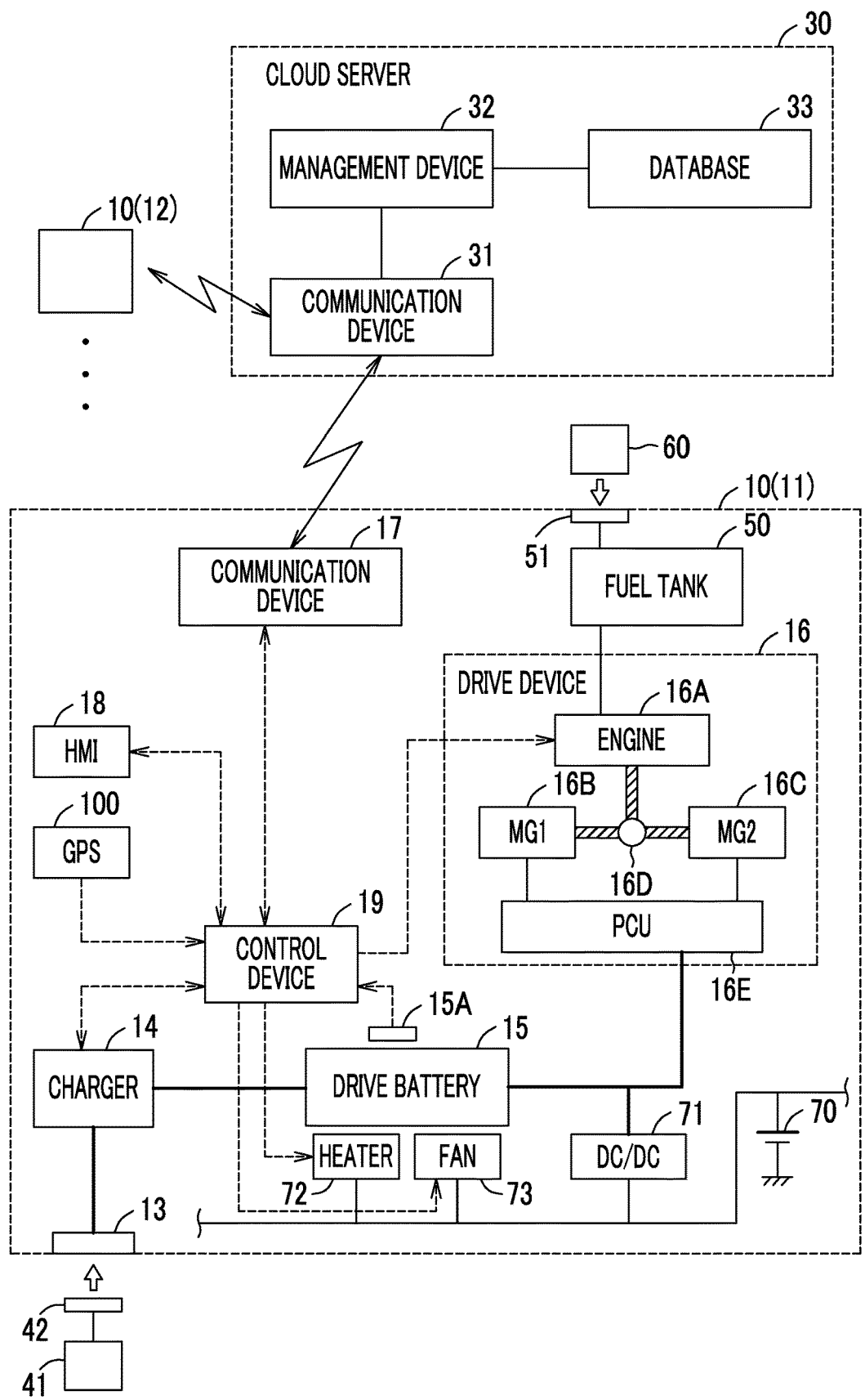
FIG. 2 is a diagram illustrating one example of a configuration of a host vehicle and a cloud server in detail.

FIG. 2 is a diagram illustrating one example of a configuration of the host vehicle 11 and the cloud server 30 in detail. In the example illustrated in FIG. 2, the host vehicle 11 is a so-called plug-in hybrid vehicle. Specifically, the host vehicle 11 includes an inlet 13, a charger 14, a drive battery 15, a drive device 16, a communication device 17, a human machine interface (HMI) device 18, a control device 19, an auxiliary battery 70, a DC/DC converter 71, a heater 72, a cooling fan 73, and a global positioning system (GPS) module 100. The cloud server 30 includes a communication device 31, a management device 32, and a database (storage device) 33.

The inlet 13 is configured to be connectable with a connector 42 of an electric power supply facility 41 outside the vehicle. The electric power supply facility 41 is connected to a system electric power source not illustrated, and is configured to be capable of supplying electric power of the system electric power source to the vehicle 10 connected to the connector 42.

The drive battery 15 is a secondary battery that stores electric power for traveling of the host vehicle 11. The drive battery 15 is, for example, a nickel-hydrogen battery or a lithium-ion battery. A monitoring unit 15A is disposed in the drive battery 15. The monitoring unit 15A detects the voltage, the current, and the temperature of the drive battery 15, and outputs the detection result to the control device 19.

The charger 14 is disposed between the inlet 13 and the drive battery 15. The charger 14 converts external electric power input from the electric power supply facility 41 into electric power that can charge the drive battery 15, and outputs the converted electric power to the drive battery 15. Hereinafter, charging of the drive battery 15 using external electric power will be referred to as "external charging".

The drive device 16 generates drive power of the host vehicle 11. The drive device 16 includes an engine 16A, a first motor generator (MG) 16B, a second MG 16C, a power split device 16D, and a power control unit (PCU) 16E.

The engine 16A is an internal combustion engine such as a gasoline engine or a diesel engine. The engine 16A is controlled with a control signal from the control device 19. In the present embodiment, the output of the engine 16A is used for both electric power generation and drive. The purpose of the engine is not limited to both electric power generation and drive, and may be electric power generation or drive.

The host vehicle 11 further includes a fuel tank 50 and a fuel filling port 51. The fuel filling port 51 is configured to be connectable with a fuel filling facility 60 in a fuel filling station. The fuel tank 50 stores fuel (gasoline or diesel or the like) supplied from the fuel filling port 51. The engine 16A generates power by using fuel supplied from the fuel tank 50.

The power generated by engine 16A is split along a transmission path to a drive wheel and a transmission path to the first MG 16B by the power split device 16D.

The first MG 16B and the second MG 16C are three-phase alternating current rotating electric devices that are driven by the PCU 16E. The first MG 16B generates electric power by using the power of the engine 16A split by the power split device 16D. The second MG 16C is connected to a drive wheel not illustrated. The second MG 16C generates the drive power of the host vehicle 11 by using at least one of the electric power stored in the drive battery 15 and the electric power generated by the first MG 16B. The second MG 16C generates regenerative electric power by using the kinetic energy of the host vehicle 11 transmitted from the drive wheel, during coasting in an accelerator OFF state (a state in which a user does not step on an accelerator pedal). The regenerative electric power generated by the second MG 16C is collected in the drive battery 15.

The power split device 16D includes a planetary gear mechanism that mechanically connects the engine 16A, the first MG 16B, and the second MG 16C (drive wheel) with each other.

The PCU 16E converts direct current electric power stored in the drive battery 15 into alternating current electric power that can drive the first MG 16B and the second MG 16C. The PCU 16E converts alternating current electric power generated in the first MG 16B and the second MG 16C into direct current electric power that can charge the drive battery 15.

The auxiliary battery 70 stores electric power for operating a plurality of auxiliary loads (the heater 72, the cooling fan 73, and the like) mounted in the host vehicle 11. The auxiliary battery 70 is configured to include, for example, a lead-acid battery. The voltage of the auxiliary battery 70 is lower than the voltage of the drive battery 15.

The DC/DC converter 71 is connected to an electric power line that connects the drive battery 15 with the PCU 16E. The DC/DC converter 71 steps down a voltage supplied from the electric power line and supplies the stepped-down voltage to the auxiliary battery 70 and the auxiliary loads.

The heater 72 and the cooling fan 73 are temperature adjusting devices for adjusting the temperature of the drive battery 15. Both the heater 72 and the cooling fan 73 are connected to the auxiliary battery 70 and the DC/DC converter 71.

The heater 72 is configured to have an electric resistance that heats the drive battery 15 by generating Joule heat using electric power supplied from the auxiliary battery 70 or the DC/DC converter 71. The amount of heat generated (the amount of electricity conducted) by the heater 72 is controlled by the control device 19.

The cooling fan 73 is configured to include a motor and a fan. The motor is operated by using electric power supplied from the auxiliary battery 70 or the DC/DC converter 71. The fan is connected to a rotating shaft of the motor. When the cooling fan 73 is operated, the cooling fan 73 takes in air within a vehicle cabin and transports the intake air to the drive battery 15. Accordingly, the drive battery 15 is cooled. The amount of air transported by the cooling fan 73 (rotational speed) is controlled by the control device 19.

The communication device 17 is configured to be wirelessly communicable with the communication device 31 of the cloud server 30. The communication device 17 is connected with the control device 19 by a communication line. The communication device 17 transmits information transmitted from the control device 19 to the cloud server 30, or transmits information received from the cloud server 30 to the control device 19.

The HMI device 18 is a device that provides various types of information to the user or is operated by the user. The HMI device 18 includes a display, a speaker, and the like disposed within the vehicle cabin.

The GPS module 100 is a reception device that is used in a satellite positioning system. The GPS module 100 calculates the current position of the host vehicle 11 based on a received signal, and outputs the calculation result to the control device 19. The GPS module 100 may be incorporated in a navigation device that includes a map database.

The host vehicle 11 further includes, though not illustrated, a plurality of sensors for detecting various physical quantities needed for control of the host vehicle 11, such as a vehicle speed sensor that detects a vehicle speed, an acceleration sensor that detects the acceleration of the host vehicle 11, and the like. Each sensor outputs the detection result to the control device 19.

The control device 19 incorporates a CPU and a memory not illustrated. The control device 19 controls each device of the host vehicle 11 (the charger 14, the drive device 16, the communication device 17, the HMI device 18, the heater 72, the cooling fan 73, and the like) based on information stored in the memory or information from each sensor.

As described above, the cloud server 30 includes the communication device 31, the management device 32, and the database 33.

The communication device 31 is configured to be wirelessly communicable with the communication device 17 of each vehicle 10. The communication device 31 is connected with the management device 32 by a communication line. The communication device 31 transmits information transmitted from the management device 32 to each vehicle 10, or transmits information received from each vehicle 10 to the management device 32.

The management device 32 incorporates a CPU not illustrated. The management device 32 stores information received from each vehicle 10 in the database 33. The management device 32 performs various calculations by using information of each vehicle 10 stored in the database 33.

Drive Battery Temperature Increasing Control

When the host vehicle 11 is left in a low temperature environment, the temperature of the drive battery 15 is decreased, and the input and output capabilities (receivable electric power and outputable electric power) of the drive battery 15 may be decreased. In such a state, when the user tries to drive the host vehicle 11, a sufficient amount of electric power cannot be supplied to the second MG 16C from the drive battery 15, and the performance of EV traveling using the second MG 16C may be decreased.

In view of such a point, the control device 19 according to the present embodiment is configured to automatically start and monitor the temperature of the drive battery 15 at predetermined cycles (for example, a few times) during a stoppage of a vehicle system of the host vehicle 11. When the control device 19 detects the temperature of the drive battery 15 being lower than a predetermined start temperature Tst, the control device 19 operates the heater 72 until the temperature of the drive battery 15 is recovered to a predetermined target temperature Ttag (Ttag>Tst). Accordingly, the drive battery 15 is heated by the heater 72, and an excessive decrease in the temperature of the drive battery 15 is suppressed.

During a stoppage of the vehicle system, the engine 16A is stopped, and the first MG 16B cannot generate electric power. Thus, the amount of electric power that can be supplied to the heater 72 is limited to the amount of electric power that remains in the auxiliary battery 70 and the drive battery 15. Thus, the way of setting the mode of operation of the heater 72 during a stoppage of the vehicle system (the way of setting the start temperature Tst and the target temperature Ttag) significantly affects the input and output capabilities of the drive battery 15 at the time of the user riding on the host vehicle 11 for the next time.

Specifically, for example, when the start temperature Tst and the target temperature Ttag are set to a level close to an appropriate temperature (a temperature that can sufficiently secure the input and output capabilities of the drive battery 15), the temperature of the drive battery 15 can be maintained at a level close to the appropriate temperature. However, the electric power consumption of the heater 72 is increased, and the time period in which the heater 72 can be operated is shortened. Thus, when the time period in which the host vehicle 11 is left is comparatively short, the input and output capabilities of the drive battery 15 can be sufficiently secured. However, when the time period in which the host vehicle 11 is left is comparatively long, supply of electric power to the heater 72 is cut, and the temperature of the drive battery 15 cannot be increased. Thus, the input and output capabilities of the drive battery 15 may not be sufficiently secured.

When the start temperature Tst and the target temperature Ttag are set to a temperature that is significantly lower than the appropriate temperature, the electric power consumption of the heater 72 is decreased, and a long time period in which the heater 72 can be operated can be secured. However, the temperature of the drive battery 15 is maintained at a temperature that is significantly lower than the appropriate temperature. Thus, when the time period in which the host vehicle 11 is left is comparatively long, the temperature of the drive battery 15 can be continuously increased to an extent in which the drive battery 15 is not frozen, but the input and output capabilities of the drive battery 15 may not be sufficiently secured.

In view of such a point, the control device 19 of the host vehicle 11 according to the present embodiment uses both a temperature history (hereinafter, referred to as "stand-alone information") of the drive battery 15 detected within the host vehicle 11 in the surrounding area of the host vehicle 11, and ambient temperature data (hereinafter, referred to as "server information") of the surrounding area of the host vehicle 11 collected in the cloud server 30, in determination of the need for increasing the temperature of the drive battery 15 during a system stoppage. Specifically, the control device 19 of the host vehicle 11 uses the stand-alone information to determine the need for increasing the temperature of the drive battery 15 during a system stoppage, and uses the server information to determine the need for increasing the temperature of the drive battery 15 during a system stoppage. The control device 19 of the host vehicle 11 selectively switches the mode of operation of the heater 72 during a system stoppage, by selecting a drive battery temperature increasing control mode during a system stoppage in accordance with the two determination results.

Figure 3:
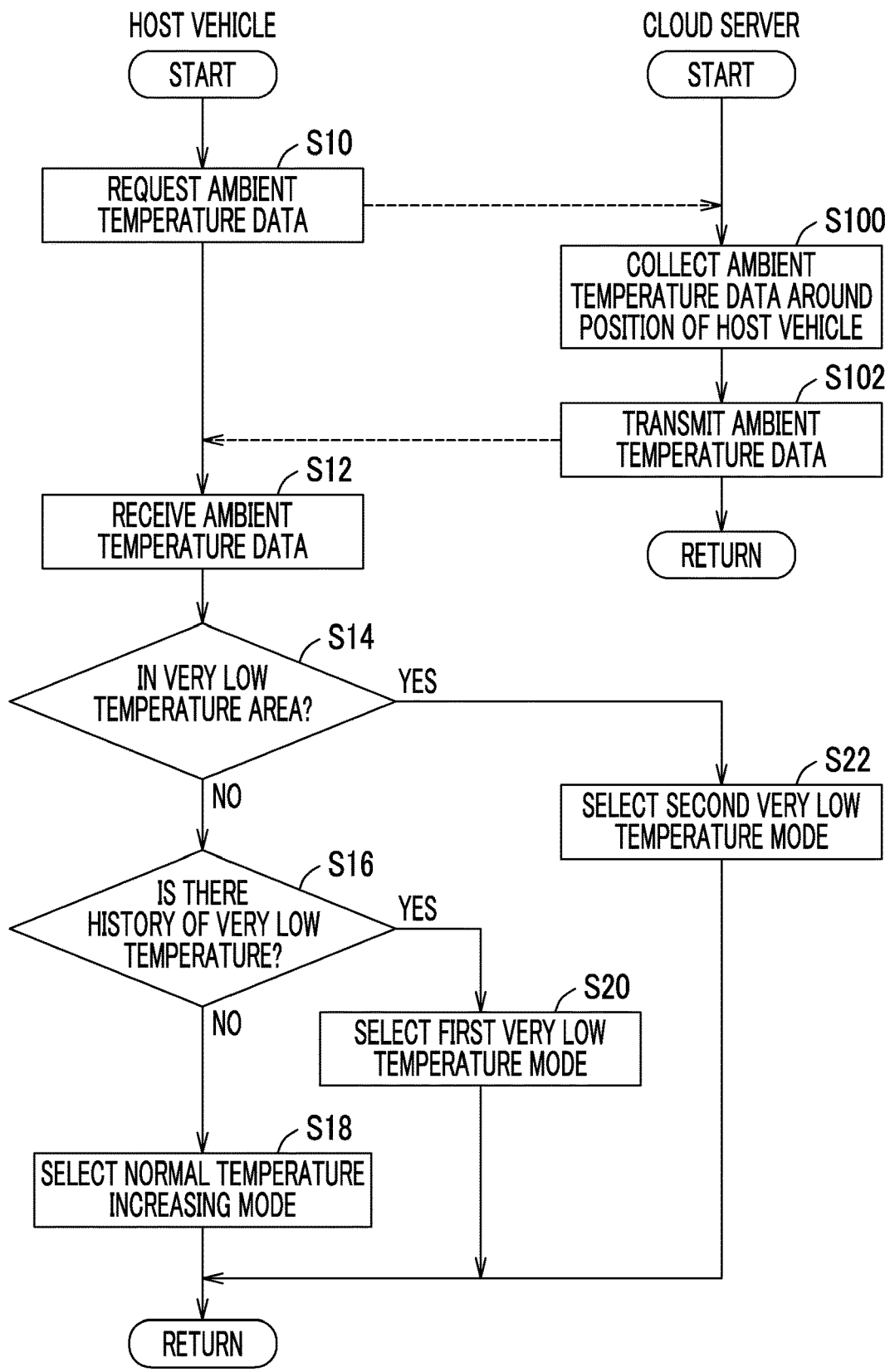
FIG. 3 is a flowchart (1) illustrating one example of a process procedure of a control device.

FIG. 3 is a flowchart illustrating one example of a process procedure that is performed when the control device 19 of the host vehicle 11 according to the present embodiment selects the drive battery temperature increasing control mode during a system stoppage. The flowchart is repeatedly executed at predetermined cycles during operation of the control device 19. FIG. 3 illustrates a process of the control device 19 of the host vehicle 11 and also a process performed by the cloud server 30 (management device 32).

The control device 19 of the host vehicle 11 transmits an ambient temperature data request signal to the cloud server 30 (step S10). The ambient temperature data request signal is a signal that requests the cloud server 30 to transmit the ambient temperature data (an ambient temperature history or a history of information having a correlation with the ambient temperature) of the surrounding area of the current position of the host vehicle 11 to the host vehicle 11. The ambient temperature data request signal includes vehicle identification information for specifying the host vehicle 11, the current position of the host vehicle 11, and the like.

When the cloud server 30 receives the ambient temperature data request signal from the host vehicle 11, the cloud server 30 extracts the ambient temperature data in the surrounding area of the current position of the host vehicle 11 included in the ambient temperature data request signal, and collects the ambient temperature data from the database 33 (step S100). The ambient temperature data collected by the cloud server 30 may include the history information for the ambient temperature received from the vehicles 10 in the surrounding area of the current position of the host vehicle 11, or may include the history information for the ambient temperature in the surrounding area of the current position of the host vehicle 11 acquired from a network such as the Internet.

The cloud server 30 transmits the collected ambient temperature data to the host vehicle 11 (step S102).

The control device 19 of the host vehicle 11 receives the ambient temperature data from the cloud server 30 (step S12).

The control device 19 of the host vehicle 11 uses the ambient temperature data (server information) received in step S12 to determine whether or not the surrounding area of the current position of the host vehicle 11 is a very low temperature area (step S14). The determination is a process of using the server information to determine the need for increasing the temperature of the drive battery 15 during a system stoppage. For example, when the ambient temperature data received from the cloud server 30 includes an ambient temperature less than or equal to a predetermined value, the control device 19 of the host vehicle 11 determines that the surrounding area is a very low temperature area (the temperature of the drive battery 15 needs to be increased).

When the control device 19 of the host vehicle 11 in step S14 determines that the surrounding area is not a very low temperature area (NO in step S14), the control device 19 of the host vehicle 11 determines whether or not there is a history of very low temperature, by using the temperature history (stand-alone information) of the drive battery 15 detected by the monitoring unit 15A within the host vehicle 11 in the surrounding area of the host vehicle 11 (step S16). The determination is a process of using the stand-alone information to determine the need for increasing the temperature of the drive battery 15 during a system stoppage. For example, when the temperature history of the drive battery 15 detected by the monitoring unit 15A within the host vehicle 11 in the surrounding area of the host vehicle 11 includes a temperature less than or equal to a predetermined value, the control device 19 of the host vehicle 11 determines that there is a history of very low temperature (the temperature of the drive battery 15 needs to be increased).

When the control device 19 of the host vehicle 11 in step S16 determines that there is not a history of very low temperature (NO in step S16), the control device 19 of the host vehicle 11 selects a "normal temperature increasing mode" as the drive battery temperature increasing control mode during a system stoppage (step S18). Accordingly, the temperature of the drive battery is increased in the normal temperature increasing mode (refer to FIG. 4 described below) during a system stoppage.

When the control device 19 of the host vehicle 11 in step S16 determines that there is a history of very low temperature (YES in step S16), the control device 19 of the host vehicle 11 selects a "first very low temperature mode" as the drive battery temperature increasing control mode during a system stoppage (step S20). Accordingly, the temperature of the drive battery 15 is increased in the first very low temperature mode (refer to FIG. 4 described below) during a system stoppage.

When the control device 19 in step S14 determines that the surrounding area is a very low temperature area (YES in step S14), the control device 19 of the host vehicle 11 selects a "second very low temperature mode" as the drive battery temperature increasing control mode during a system stoppage (step S22). Accordingly, the temperature of the drive battery 15 is increased in the second very low temperature mode (refer to FIG. 4 described below) during a system stoppage.

FIG. 4 is a diagram illustrating one example of the start temperature Tst, the target temperature Ttag, and a heater operating duration in the normal temperature increasing mode and the very low temperature mode (the first very low temperature mode and the second very low temperature mode).

As illustrated in FIG. 4, in the normal temperature increasing mode, the start temperature Tst is set to an initial value Tst0, and the target temperature Ttag is set to an initial value Ttag0 (Ttag0>Tst0). That is, when the normal temperature increasing mode is selected, the heater 72 is operated when the temperature of the drive battery 15 becomes less than or equal to the start temperature Tst0 during a system stoppage. The heater 72 is stopped when the temperature of the drive battery 15 is recovered to the target temperature Ttag0.

In the first very low temperature mode, the start temperature Tst is set to a predetermined value Tst1 that is lower than the initial value Tst0. The target temperature Ttag is set to a predetermined value Ttag1 that is lower than the initial value Ttag0. In the second very low temperature mode, the start temperature Tst is set to a predetermined value Tst2 that is lower than the predetermined value Tst1. The target temperature Ttag is set to a predetermined value Ttag2 that is lower than the predetermined value Ttag1.

Such setting causes the temperature of the drive battery 15 at the time of selecting the very low temperature mode (the first very low temperature mode or the second very low temperature mode) to be maintained at a value lower than at the time of selecting the normal temperature increasing mode. However, heater operating durations H1, H2 at the time of selecting the very low temperature mode becomes longer than a heater operating duration H0 at the time of selecting the normal temperature increasing mode. The temperature of the drive battery 15 at the time of selecting the second very low temperature mode is maintained at a value lower than at the time of selecting the first very low temperature mode. However, the heater operating duration H2 at the time of selecting the second very low temperature mode becomes longer than the heater operating duration H1 at the time of selecting the first very low temperature mode.

When the control device 19 of the host vehicle 11 determines, by using the server information, that the surrounding area of the current position of the host vehicle 11 is a very low temperature area (the temperature of the drive battery 15 needs to be increased), the control device 19 of the host vehicle 11 determines that the drive battery 15 has a high possibility of having a very low temperature during a system stoppage, and selects the second very low temperature mode. In the second very low temperature mode, the target temperature Ttag2 of the drive battery 15 is lower than in the other modes, but the longest heater operating duration H2 can be secured. Thus, for example, even when the host vehicle 11 is unusually left in a very low temperature area, freezing of the drive battery 15 can be suppressed for a longer period than usual. Consequently, when the user rides on the host vehicle 11 for the next time, a situation in which the drive battery 15 is frozen and cannot be used can be avoided.

Even when the control device 19 of the host vehicle 11 determines, by using the server information, that the surrounding area is not a very low temperature area, the control device 19 of the host vehicle 11 selects the first very low temperature mode by considering the possibility of the drive battery 15 having a very low temperature during a system stoppage, when the control device 19 of the host vehicle 11 determines, by using the stand-alone information, that there is a history of very low temperature (the temperature of the drive battery 15 needs to be increased). The target temperature Ttag1 of the first very low temperature mode is higher than the target temperature Ttag2 of the second very low temperature mode. Thus, while the heater operating duration H1 of the first very low temperature mode is shorter than the heater operating duration H2 of the second very low temperature mode, the temperature of the drive battery 15 can be maintained at a higher value in the first very low temperature mode. Consequently, for example, when the user uses the host vehicle 11 for commuting from home (when the period before the user rides on the host vehicle 11 for the next time is comparatively short), the input and output capabilities of the drive battery 15 (EV traveling performance) can be sufficiently secured.

As described heretofore, the control device 19 of the host vehicle 11 according to the present embodiment uses the stand-alone information and the server information to determine the need for increasing the temperature of the drive battery 15 during a system stoppage. Thus, the need for increasing the temperature of the drive battery 15 can be more accurately determined than when one of the stand-alone information and the server information is used. The control device 19 of the host vehicle 11 selectively switches the mode of operation of the heater 72 during a system stoppage, by selecting the drive battery temperature increasing control mode during a system stoppage in accordance with the two determination results. Accordingly, the temperature of the drive battery 15 can be increased by appropriately selecting the mode of operation of the heater 72, considering both the stand-alone information and the server information. Consequently, the temperature of the drive battery 15 can be appropriately increased.

Particularly, when the control device 19 of the host vehicle 11 according to the embodiment determines, by using the server information, that the temperature of the drive battery 15 needs to be increased, the control device 19 of the host vehicle 11 determines that the drive battery 15 has a high possibility of having a very low temperature during a system stoppage, and selects the second very low temperature mode that has a lower target temperature but a longer heater operating duration than the first very low temperature mode. Thus, for example, even when the host vehicle 11 is unusually left in a very low temperature area, the freezing of the drive battery 15 can be suppressed for a longer period than usual. Consequently, when the user rides on the host vehicle 11 for the next time, a situation in which the drive battery 15 is frozen and cannot be used can be avoided.

Even when the control device 19 of the host vehicle 11 determines, by using the server information, that the temperature of the drive battery 15 does not need to be increased, the control device 19 of the host vehicle 11 according to the embodiment selects the first very low temperature mode, which has a shorter heater operating duration but a higher target temperature than the second very low temperature mode, by considering the possibility of the drive battery 15 having a very low temperature during a system stoppage, when the control device 19 of the host vehicle 11 determines, by using the stand-alone information, that the temperature of the drive battery 15 needs to be increased. Consequently, for example, even when the user uses the host vehicle 11 for commuting from home, a sufficient level of EV traveling performance can be secured.

Pre-Charging Drive Battery Cooling Control

For example, when the user of the host vehicle 11 returns home from an outing, the drive battery 15 may be placed into a high temperature state due to driving during the time of the outing. When external charging is executed in such a state, the drive battery 15 is left in a high temperature state due to heat generated by charging, and the drive battery 15 may deteriorate. Particularly, when the drive battery 15 is in a high temperature state, and the state of charge (SOC) of the drive battery 15 is increased by external charging, the drive battery 15 may deteriorate more quickly.

In view of such a point, the control device 19 of the host vehicle 11 according to the present embodiment determines the need for cooling the drive battery 15 before external charging. When the control device 19 of the host vehicle 11 determines that the drive battery 15 needs to be cooled, the control device 19 of the host vehicle 11 executes "pre-charging cooling control" that cools the drive battery 15, by operating the cooling fan 73 before executing external charging.

In determination of the need for cooling the drive battery 15 before external charging, the control device 19 of the host vehicle 11 uses both the temperature history (stand-alone information) of the drive battery 15 detected within the host vehicle 11 in the surrounding area of the host vehicle 11, and the ambient temperature data (server information) of the surrounding area of the host vehicle 11 collected in the cloud server 30, in the same manner as when determining the need for increasing the temperature of the drive battery 15.

Specifically, the control device 19 of the host vehicle 11 uses the stand-alone information to determine the need for cooling the drive battery 15 before external charging, and uses the server information to determine the need for cooling the drive battery 15 before external charging. The control device 19 of the host vehicle 11 determines whether or not to execute the pre-charging cooling control, in accordance with the two determination results.

Figure 5:
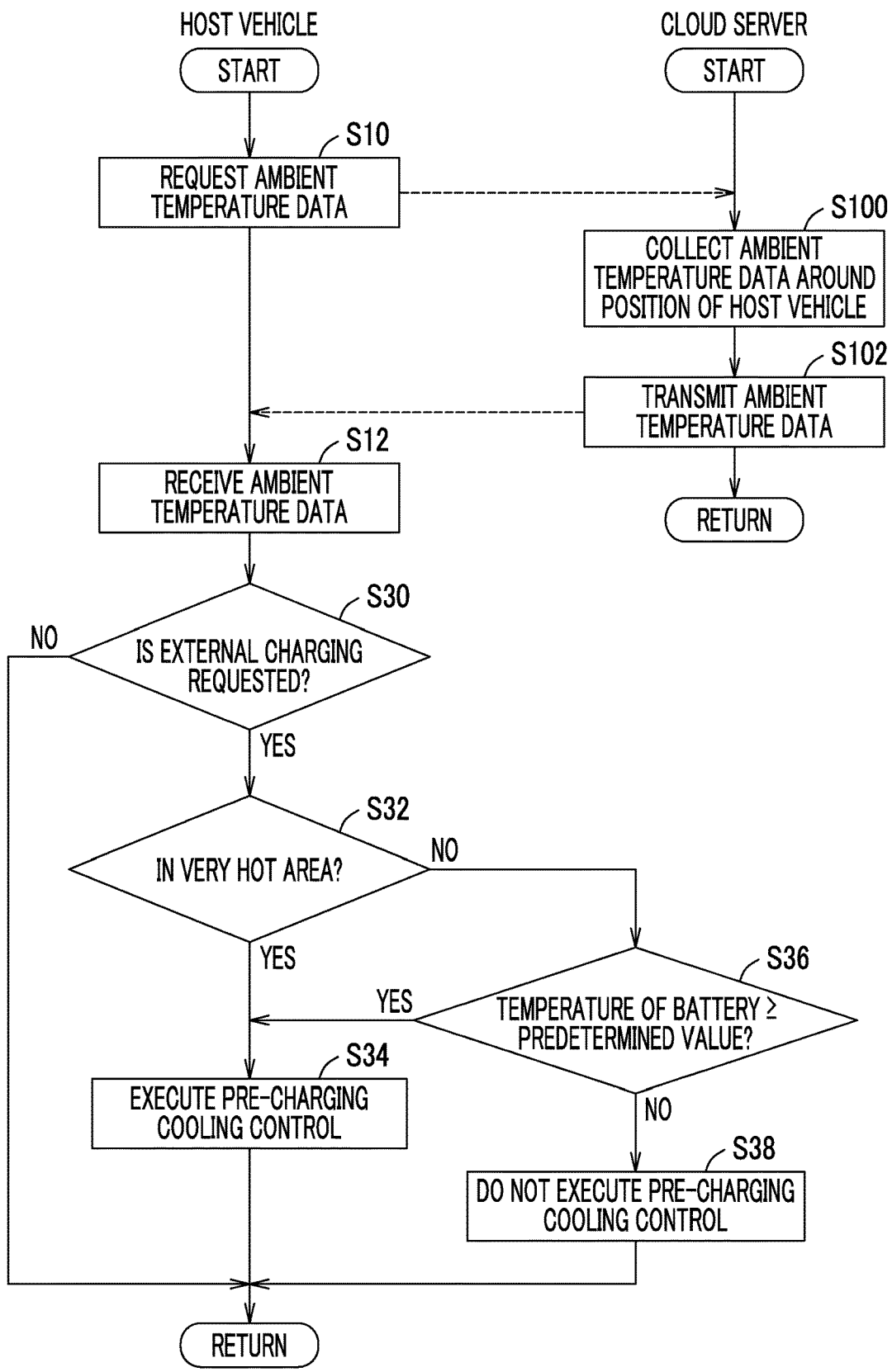
FIG. 5 is a flowchart (2) illustrating one example of the process procedure of the control device.

FIG. 5 is a flowchart illustrating one example of a process procedure that is performed when the control device 19 of the host vehicle 11 according to the present embodiment determines whether or not to execute the pre-charging cooling control. In FIG. 5, steps that are designated with the same numbers as the steps illustrated in FIG. 3 are already described and will not be described in detail here.

The control device 19 of the host vehicle 11 determines whether or not external charging is requested (step S30). For example, the control device 19 of the host vehicle 11 determines that external charging is requested, when the user performs an operation for starting external charging on the electric power supply facility 41 with the connector 42 of the electric power supply facility 41 connected to the inlet 13.

When the control device 19 of the host vehicle 11 in step S30 determines that external charging is not requested (NO in step S30), the control device 19 of the host vehicle 11 skips onward processes and transitions to a return.

When the control device 19 of the host vehicle 11 in step S30 determines that external charging is requested (YES in step S30), the control device 19 of the host vehicle 11 uses the ambient temperature data (server information) received in step S12 to determine whether or not the surrounding area of the current position of the host vehicle 11 is a very hot area (step S32). The determination is a process of using the server information to determine the need for cooling the drive battery 15 before external charging. For example, when the ambient temperature data received from the cloud server 30 includes an ambient temperature greater than or equal to a predetermined value, the control device 19 of the host vehicle 11 determines that the surrounding area is a very hot area (the drive battery 15 needs to be cooled).

When the control device 19 of the host vehicle 11 in step S32 determines that the surrounding area is not a very hot area (NO in step S32), the control device 19 of the host vehicle 11 determines whether or not the temperature of the drive battery 15 has a history of being greater than or equal to a predetermined value, by using the temperature history (stand-alone information) of the drive battery 15 detected by the monitoring unit 15A within the host vehicle 11 in the surrounding area of the host vehicle 11 (step S36). The determination is a process of using the stand-alone information to determine the need for cooling the drive battery 15 before external charging.

When the control device 19 of the host vehicle 11 in step S32 determines that the surrounding area is a very hot area (YES in step S32), or when the control device 19 of the host vehicle 11 in step S36 determines that the temperature of the drive battery 15 has a history of being greater than or equal to a predetermined value (YES in step S36), the control device 19 of the host vehicle 11 executes the pre-charging cooling control (step S34). After the pre-charging cooling control is executed, the control device 19 of the host vehicle 11 executes external charging.

When the control device 19 of the host vehicle 11 in step S32 determines that the surrounding area is not a very hot area (NO in step S32), and when the control device 19 of the host vehicle 11 in step S36 determines that the temperature of the drive battery 15 does not have a history of being greater than or equal to a predetermined value (NO in step S36), the control device 19 of the host vehicle 11 does not execute the pre-charging cooling control (step S38). That is, the control device 19 of the host vehicle 11 executes external charging without executing the pre-charging cooling control.

As described heretofore, the control device 19 of the host vehicle 11 according to the present embodiment uses the stand-alone information and the server information to determine the need for cooling the drive battery 15 before external charging. Thus, the need for cooling the drive battery 15 can be more accurately determined than when one of the stand-alone information and the server information is used. The control device 19 of the host vehicle 11 selectively switches the mode of operation (operating or stopping) of the cooling fan 73 by selecting whether or not to execute the pre-charging cooling control in accordance with the two determination results. Accordingly, the drive battery 15 can be cooled by appropriately selecting the mode of operation of the cooling fan 73, considering both the stand-alone information and the server information. Consequently, the drive battery 15 can be appropriately cooled before charging.

Modification Example 1

The technique of switching the mode of operation of the temperature adjusting devices (the heater 72 and the cooling fan 73) for the drive battery 15 illustrated in FIG. 3 and FIG. 5 are for illustrative purposes and is not limited.

The technique of switching the mode of operation of the heater 72 is illustrated in FIG. 3 such that the control device 19 of the host vehicle 11 selects the first very low temperature mode when the control device 19 of the host vehicle 11 determines, by using the stand-alone information, that the temperature of the drive battery 15 needs to be increased, and that the control device 19 of the host vehicle 11 selects the second very low temperature mode when the control device 19 of the host vehicle 11 determines, by using the server information, that the temperature of the drive battery 15 needs to be increased.

However, for example, the control device 19 of the host vehicle 11 may select the first very low temperature mode when one of the stand-alone information and the server information indicates that the temperature of the drive battery 15 needs to be increased. When both the stand-alone information and the server information indicate that the temperature of the drive battery 15 needs to be increased, the control device 19 of the host vehicle 11 may determine that the drive battery 15 has a high possibility of having a very low temperature, and select the second very low temperature mode that has a lower target temperature but a longer heater operating duration than the first very low temperature mode.

Alternatively, for example, the control device 19 of the host vehicle 11 may not select the very low temperature mode and select the normal temperature increasing mode when one of the stand-alone information and the server information indicates that the temperature of the drive battery 15 needs to be increased. The control device 19 of the host vehicle 11 may select the very low temperature mode (the first very low temperature mode or the second very low temperature mode) when both the stand-alone information and the server information indicate that the temperature of the drive battery 15 needs to be increased.

The technique of switching the mode of operation of the cooling fan 73 is illustrated in FIG. 5 such that the control device 19 of the host vehicle 11 executes the pre-charging cooling control when both the stand-alone information and the server information indicate that the drive battery 15 needs to be cooled before charging, and otherwise, does not execute the pre-charging cooling control.

However, for example, the control device 19 of the host vehicle 11 may execute the pre-charging cooling control when one of the stand-alone information and the server information indicates that the drive battery 15 needs to be cooled before charging. The mode of operation (the operating time period, the target temperature, and the like) of the cooling fan 73 may be different when the stand-alone information indicates that the drive battery 15 needs to be cooled before charging, when the server information indicates that the drive battery 15 needs to be cooled before charging, and when both the stand-alone information and the server information indicate that the drive battery 15 needs to be cooled before charging.

Modification Example 2

While the embodiment describes the technique of switching the mode of operation of the heater 72 (FIG. 3) and the technique of switching the mode of operation of the cooling fan 73 (FIG. 5), the present disclosure does not need to include both switching techniques and may include any one switching technique.

Modification Example 3

While FIG. 5 describes an example of executing the pre-charging cooling control in step S34 and not executing the pre-charging cooling control in step S38, a message that asks the user whether or not to execute the pre-charging cooling control may be displayed on the HMI device 18 in step S34, and the message may not be displayed on the HMI device 18 in step S38. In such a case, the control device 19 of the host vehicle 11 may execute external charging control when the user permits execution of the pre-charging cooling control in response to the message.

Modification Example 4

The embodiment describes an example in which the host vehicle 11 executes the process of determining the need for increasing the temperature of the drive battery 15 (steps S14, S16, and the like in FIG. 3) and the process of determining the need for cooling the drive battery 15 (steps S32, S36, and the like in FIG. 5).

However, those processes may be performed by the cloud server 30. For example, the host vehicle 11 may transmit the stand-alone information to the cloud server 30. The cloud server 30 may determine the need for increasing the temperature of the drive battery 15 and the need for cooling the drive battery 15, and transmit the determination results to the host vehicle 11. In such a case, the control device 19 of the host vehicle 11 may switch the mode of operation of the temperature adjusting devices (the heater 72 and the cooling fan 73) for the drive battery 15 in accordance with the determination results received from the cloud server 30.

The embodiment and Modification Examples 1 to 4 may be appropriately combined with each other to an extent not posing technical inconsistencies.

The embodiment disclosed herein is for illustrative purposes from every point of view and should not be considered restrictive. The scope of the present disclosure is not disclosed by the description and is disclosed by the claims, and is intended to include all changes made within the equivalent meaning and scope of the claims.

What is claimed is:

1. An electric vehicle comprising:
a battery that stores electric power for traveling;
a sensor that detects a temperature of the battery;
a communication circuitry programmed to communicate with a server programmed to collect information as to a plurality of vehicles, the information as to the vehicles including at least an ambient temperature in a surrounding area of each vehicle;
a temperature adjusting circuitry programmed to adjust the temperature of the battery; and
a control circuitry programmed to control the temperature adjusting circuitry, the control circuitry programmed to selectively switch a mode of operation of the temperature adjusting circuitry using a first result of a first determination of whether to adjust the temperature of the battery based on whether the temperature of the battery is below a first predetermined value, and a second result of a second determination of whether to increase the temperature of the battery based on whether the ambient temperature collected in the server is below a second predetermined value.

2. The electric vehicle according to claim 1, wherein:
the control circuitry is programmed to, based on the first result, operate the temperature adjusting circuitry in a first mode based on the control circuitry determining to adjust the temperature of the battery by using the temperature of the battery, and to, based on the second result, operate the temperature adjusting circuitry in a second mode having a different mode of operation of the temperature adjusting circuitry from the first mode based on the control circuitry determining to adjust the temperature of the battery by using the ambient temperature.

3. The electric vehicle according to claim 1, wherein:
the temperature adjusting circuitry includes a temperature increasing circuitry programmed to increase the temperature of the battery by using electric power of the battery; and
the control circuitry is programmed to, based on the first result, operate the temperature increasing circuitry in a first mode having a target temperature of the battery equal to a first temperature based on the control circuitry determining, by using the temperature of the battery detected by the sensor, that the temperature of the battery needs to be increased, and to, based on the second result, operate the temperature increasing circuitry in a second mode having the target temperature of the battery equal to a second temperature lower than the first temperature based on the control circuitry determining, by using the ambient temperature collected in the server, that the temperature of the battery needs to be increased.

4. The electric vehicle according to claim 3, wherein the control circuitry is programmed to, based on the first result, select the first mode based on the temperature of the battery detected in a current position of the electric vehicle having a history of being decreased below the first predetermined value, and to, based on the second result, select the second mode based on the ambient temperature in the surrounding area of the current position of the electric vehicle having a history of being decreased below the second predetermined value.

5. The electric vehicle according to claim 1, wherein:
the temperature adjusting circuitry includes a cooling circuitry programmed to cool the battery; and
based on the control circuitry executing external charging that charges the battery with electric power from outside the vehicle, the control circuitry is programmed to execute pre-charging cooling control that cools the battery by operating the cooling circuitry before executing the external charging, based on the control circuitry determining, by using at least one of the temperature of the battery detected by the sensor and the ambient temperature collected in the server, that the battery needs to be cooled, and based on the control circuitry executing the external charging, the control circuitry is programmed to not execute the pre-charging cooling control based on the control circuitry determining, by using both the temperature of the battery detected by the sensor and the ambient temperature collected in the server, that the battery does not need to be cooled.

6. The electric vehicle according to claim 5, wherein the control circuitry is programmed to determine that the battery needs to be cooled, based on the temperature of the battery detected at a time of executing the external charging being greater than or equal to a first predetermined value, and determine that the battery needs to be cooled, based on the ambient temperature in the surrounding area of a current position of the electric vehicle having a history of being increased to or above a second predetermined value.

7. The electric vehicle according to claim 1, wherein the ambient temperature is an atmospheric temperature of a position of the vehicle.

8. The electric vehicle according to claim 1, wherein the control circuitry is programmed to control the temperature adjusting circuitry based on the ambient temperature received from the server.

9. An electric vehicle comprising:
a battery that stores electric power for traveling;
a sensor that detects a temperature of the battery;
a communication circuitry programmed to communicate with a server programmed to collect information as to a plurality of vehicles, the information as to the vehicles including at least an ambient temperature in a surrounding area of each vehicle;
a cooling circuitry programmed to cool the battery; and
a control circuitry programmed to control the cooling circuitry, the control circuitry programmed to selectively execute pre-charging cooling control using a first result of a first determination of whether to cool the battery based on whether the temperature of the battery is greater than or equal to a first predetermined value, and a second result of a second determination of whether to cool the battery based on whether the ambient temperature collected in the server is greater than or equal to a second predetermined value.

\* \* \* \* \*